Patented Feb. 20, 1940 2,190,702

UNITED STATES PATENT OFFICE 2,190,702

PARASITICIDE AND METHOD OF PREPARING SAME

Robert H. Daines, Jr., Highland Park, N. J., assignor to Endowment Foundation, New Brunswick, N. J., a corporation of New Jersey No Drawing. Application July 25, 1935, Serial No. 33,101

7 Claims. (Cl. 167—19)

This invention relates to the preparation and use of a parasiticide for the control of seed and plant parasites.

The invention contemplates the use of metallic mercury as a parasiticide, either as a dust for seeds, a plant part dip, or for soil treatment. In the past few years, mercury salts have been extensively used as soil treatments, as dips for tubers and the like, and as dusts for seeds, and as sprays for above-ground portions of plants. As such, they have in general proven to be of value in protecting the host against invasion by microorganisms. In certain soils, however, mercury salts have consistently given unsatisfactory protection to the plants where protection was desired, either when used as a soil treatment or as a dip for underground plant parts.

As far as I am aware, the metallic mercury mixtures which have been used in the past have simply been prepared by mixing metallic mercury with a diluent, or else they have been prepared chemically by simply mixing a mercury salt with an alkaline material, such as some form of lime, the result of which is a precipitate of mercuric oxide on the alkaline diluent. This mercuric oxide is further reduced to metallic mercury by the addition of some appropriate reducing agent, after which the product is filtered off and dried for use as a dust. However, in this latter method, the high proportion of the alkaline material to the amount of metallic mercury is objectionable, as will be later pointed out.

A very important point which emphasizes the undesirability of the carrier being alkaline in nature will be made clear by the following: Inorganic soil colloids have the power of uniting chemically with cations. This union is loose and unstable in the cases of hydrogen, sodium, etc., but much more firm in the case of mercury. The amounts of the cations bound in this manner vary with the pH of the system, the quantity increasing rapidly as the system becomes more alkaline. To illustrate, a 25 gram sample of a sassafras loam at a pH of 6.5, bound and held against leaching with 200 c. c. of water, three times as much mercury as did a comparable sample of soil at a pH of 4.9.

When metallic mercury is mixed in a soil, there is a tendency for some of the mercury to go into solution. As the mercury goes into solution it is bound by the system. This procedure is continued until the system in the immediate vicinity of the metallic mercury particle is saturated with mercury, whereupon an equilibrium is established after which the amount of metallic mercury is not reduced by its going into solution; or the metallic mercury particle goes completely into solution and is bound by the system. In the first case, the metallic mercury remaining as such after the system becomes saturated with soluble mercury, is available for vaporization and hence can exercise its fungicidal powers at a considerable distance by penetrating the soil in the vapor form. In the second example given above, the metallic mercury is not available for vaporization because it has gone into solution and bound locally by the system.

Where metallic mercury is deposited on an alkaline carrier, the soil in the immediate vicinity is made more alkaline than where the carrier is neutral. The alkalies required for the chemical method of depositing metallic mercury on a carrier would very likely make the soil immediately surrounding them even more alkaline than pH 7.0. This being the case, the capacity of the soil for binding the soluble mercury phase would be greatly increased, which in turn would decrease the amount of mercury remaining in the metallic state, which in turn would decrease the effectiveness of the fungicide.

After much experimentation with the various salts of mercury, I have come to the conclusion that metallic mercury furnishes the vapor that migrates and contributes to killing the fungus growth. In addition, it should be noted that the vapor pressure of metallic mercury is higher than is the vapor pressure of any other known inorganic mercury compound.

The problem then is to produce a mercurial in which the mercury is present as metallic mercury. From my experiments I have also determined that to get the best results, mercury should be used in a very fine state, and in the manner to be hereinafter set forth, and which is distinctly different from any other process of which I am aware.

The finished parasiticide product herein specifically claimed should have suitable physical properties to enable it to be used as a soil treatment as heretofore pointed out.

In my development work, I secured most excellent results by preparing parasiticide in the following manner:

Metallic mercury was placed in a suitable heating vessel, such as an Erlenmeyer container, through the stopper of which an air tube extends to some point over the mercury. A T-shaped tube has one arm extending through the stopper of the container, while another arm extends into a receptacle, the stem of the T going through the stopper of another vessel, within which is placed a carrier in a dust form. Connected to this same vessel, is an air pipe preferably joined to the air line going to the Erlenmeyer tube, and both extending to a pump or source of air under pressure. The mercury in the Erlenmeyer is brought to or nearly to the boiling point by heating, causing the mercury to vaporize quite rapidly, and these hot vapors are carried by the current of air out of the Erlenmeyer by way of the T tube, and contact with the dust particles of the carrier coming from the other vessel. Due to differences in temperature, the mercury vapors, in the form of very small globules, are deposited on the carrier and transmitted into the receiving chamber. By this method a mixture of metallic mercury, with any desired carrier, can be made, provided only that the carrier is capable of being dusted or sprayed. Therefore my new method of preparing the parasiticide or dip is a decided improvement in every way over any method so far proposed, or of which I am aware.

With this process, it is thus possible to select carriers which possess the desired physical properties best suited for the use for which they are intended. For example, when the parasiticide is to be used as a dust for seeds, a carrier that has high adhesive properties to the particular seed treated should be used. When the parasiticide is to be used only as a dip, the carrier should possess lyophilic properties such as bentonite. When the parasiticide is to be used as a soil treatment, the carrier can be most anything, as long as the mercury is in a finely divided state, as indicated above. For example, talc not having much affinity for water and which does not form lumps readily, may be mixed with a fertilizer for treatment of some soils. When the soil has high oxidizing properties, a metal higher than mercury in the electro-motive series is highly essential for reasons which will be later pointed out.

The chemical methods which have been used in the past for the production of a mixture of metallic mercury and a diluent, depend on the carrier being alkaline enough to form the oxide of mercury when it comes in contact with a mercury salt. This limits the diluents to a group of alkaline materials, such as calcium lime, magnesium lime, etc., which do not have pronounced lyophilic properties. Due to their lack of lyophilic properties, they do not form around themselves, a water shell sufficient to be of much use. This lack of affinity for the solvent causes them to settle to the bottom rapidly, which property is very undesirable in a plant part dip.

In the many tests that I have made, I have found that a fungicide prepared as heretofore described, and used in the soil in a similar manner to other materials, including mercury compounds, is far superior and much more effective in controlling Rhizoctonia, a fungous growth that attacks potato plants, than fungicides heretofore used. The reason for this greater effectiveness, I believe to be because the mercury is in a finely divided form, whereby the chemically unreactive mercury volatilizes, and the vapors penetrate the soil to a considerable distance, so that the protective action is available at a considerable distance from the point of application; whereas in the past the methods used to produce a parasiticide containing metallic mercury, as has been pointed out, have not been such that the mercury could be uniformly mixed, or when uniformly mixed, an undesirable alkaline diluent has been required. When the salts of mercury are used, these are in many cases dissipated in the soil without being converted into metallic mercury, which is the vapor giving substance.

For use in soils which have an oxidation potential high enough to convert part or all of the metallic mercury into a soluble state before the critical disease period arrives, a carrier should be used which has the power of converting the soluble mercury back into the insoluble metal. Such carriers are:

| | |
|---|---|
| Magnesium | Nickel |
| Aluminum | Tin |
| Manganese | Lead |
| Zinc | Copper |
| Cadmium | Bismuth |
| Iron | Antimony |

which have the power of doing this to a greater or lesser degree; that is to say, one metal higher than another in the above series has a greater tendency to go into solution than one below it; or, stated in another way, a metal listed first above another will be completely dissolved before a following metal in the list is much affected. However, after the first metal goes into solution, the second metal may also become soluble. Thus, if the metal zinc and a mercury salt be mixed together and applied to the soil, a reaction takes place which produces zinc salt and metallic mercury, which will then give off its vapors to destroy the fungous growth on the plant.

I have secured excellent results with zinc because it is easily dusted, in addition to being relatively cheap and light, and does not possess great toxic properties itself.

Copper, in some respects, is even better than zinc, because it does not go into solution as easily as zinc and thus will provide a longer period of usefulness in the soil.

The carrier may be composed of more than one material. For example, one of the metals in the electro-motive group higher than mercury, may be mixed with some other material to jointly act as a carrier material. Therefore, in the claims, the word "carrier" is to be considered as composed of one or more materials.

From what has been said, it will be seen that the details for carrying out my invention, may vary over a considerable range without departing from the spirit of the invention or the scope of the appended claims.

What I claim is:

1. A parasiticide for controlling plant parasites in or on the soil including mercury and a carrier in a relatively finely divided state including at least one metal in the electro-motive series above metallic mercury.

2. A parasiticide for controlling plant parasites in or on the soil including mercury and a metallic carrier in a relatively finely divided state for said mercury, the carrier being higher in the electro-motive series than mercury.

3. A parasiticide for controlling seed and plant diseases substantially in the manner described including metallic mercury and a carrier comprising at least one metal higher in the electro-motive series than metallic mercury and in a relatively finely divided solid state.

4. The method of preparing a parasiticide for the control of seed and plant parasites which consists in putting metallic mercury into a vessel and applying heat thereto to cause a mercury vapor to be formed, putting a dry powdered carrier into another vessel, connecting both vessels to a common discharge member and forcing, as by a stream of air, the mercury vapor and the powdered carrier into said common member whereby fine particles of metallic mercury are deposited on the powdered particles of said carrier.

5. The method of preparing a parasiticide for the control of seed and plant parasites which consists in heating metallic mercury to cause it to pass into a vapor, then passing this vapor into contact with fine sub-divisions of a metallic carrier higher in the electro-motive series than metallic mercury.

6. The method of preparing a parasiticide for the control of seed and plant parasites which consists in heating metallic mercury to cause it to pass into a vapor, then passing this vapor into contact with fine sub-divisions of a carrier containing at least one metal, in the electro-motive series above metallic mercury.

7. The method of preparing a parasiticide for application to the soil in the manner described for the control of seed and plant parasites, which consists in making an intimate union between at least one metal in a relatively finely divided state higher in the electro-motive series than metallic mercury, and metallic mercury, said one metal acting to decrease the soluble phase of the mercury.

ROBERT H. DAINES, Jr.